US007610619B2

(12) United States Patent
Kastelewicz et al.

(10) Patent No.: US 7,610,619 B2
(45) Date of Patent: Oct. 27, 2009

(54) METHOD FOR REGISTERING A COMMUNICATION TERMINAL

(75) Inventors: Georg Kastelewicz, Berlin (DE); Peter Kim, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 1473 days.

(21) Appl. No.: 10/442,184

(22) Filed: May 21, 2003

(65) Prior Publication Data

US 2004/0153667 A1 Aug. 5, 2004

(30) Foreign Application Priority Data

May 22, 2002 (DE) ................. 102 23 248

(51) Int. Cl.
*H04L 29/04* (2006.01)
(52) U.S. Cl. .............. 726/10; 726/4; 726/5; 726/9
(58) Field of Classification Search ................ None
See application file for complete search history.

(56) References Cited

U.S. PATENT DOCUMENTS 6,865,681 B2 * 3/2005 Nuutinen .............. 726/14

OTHER PUBLICATIONS

3GPP TS 24.228 v5.0.0, Signalling flows for the IP multimedia call control based on SIP and SDP, pp. 1-41.*
3rd Generation Partnership Project, "Technical Specification Group Core Network; Packet Domain; Interworking between the Public Land Mobile Network (PLMN) Supporting Packet Based Services and Packet Data Networks (PDN)," 3GPP TS 29.061, Release 5, pp. 1-53.
3rd Generation Partnership Project, "Technical Specification Group Services and System Aspects; IP Multimedia Subsystem (IMS)," Stage 2, 3GPP TS 23.228, Release 5, pp. 1-144.
3rd Generation Partnership Project, "Technical Specification Group Core Network; Signalling flows for the IP multimedia call control based on SIP and SDP," Stage 3, Release 5, 3GPP TS 24.228, pp. 1-690.

* cited by examiner

*Primary Examiner*—Emmanuel L Moise
*Assistant Examiner*—David J Pearson
(74) *Attorney, Agent, or Firm*—King & Spalding L.L.P.

(57) ABSTRACT

The invention relates to a method for registering a communication terminal with a service network which organizes a communication service. Within this context, in a preliminary step, a logon IP address which was assigned to the communication terminal when the communication terminal logged onto the access network is received by the service network and is stored therein for the respective user of the communication terminal. When a first registration message sent by the communication terminal is received a token is transmitted to the communication terminal using a transport message, the token having been produced by the service network from the logon IP address and a random number using an encryption method, and token data associated with the token having been stored in the service network. When a second registration message which is sent by the communication terminal and contains the token is received the service network compares the token received, a public identifier and/or a private identifier with stored variables.

10 Claims, 2 Drawing Sheets

METHOD FOR REGISTERING A COMMUNICATION TERMINAL

Figure 1:
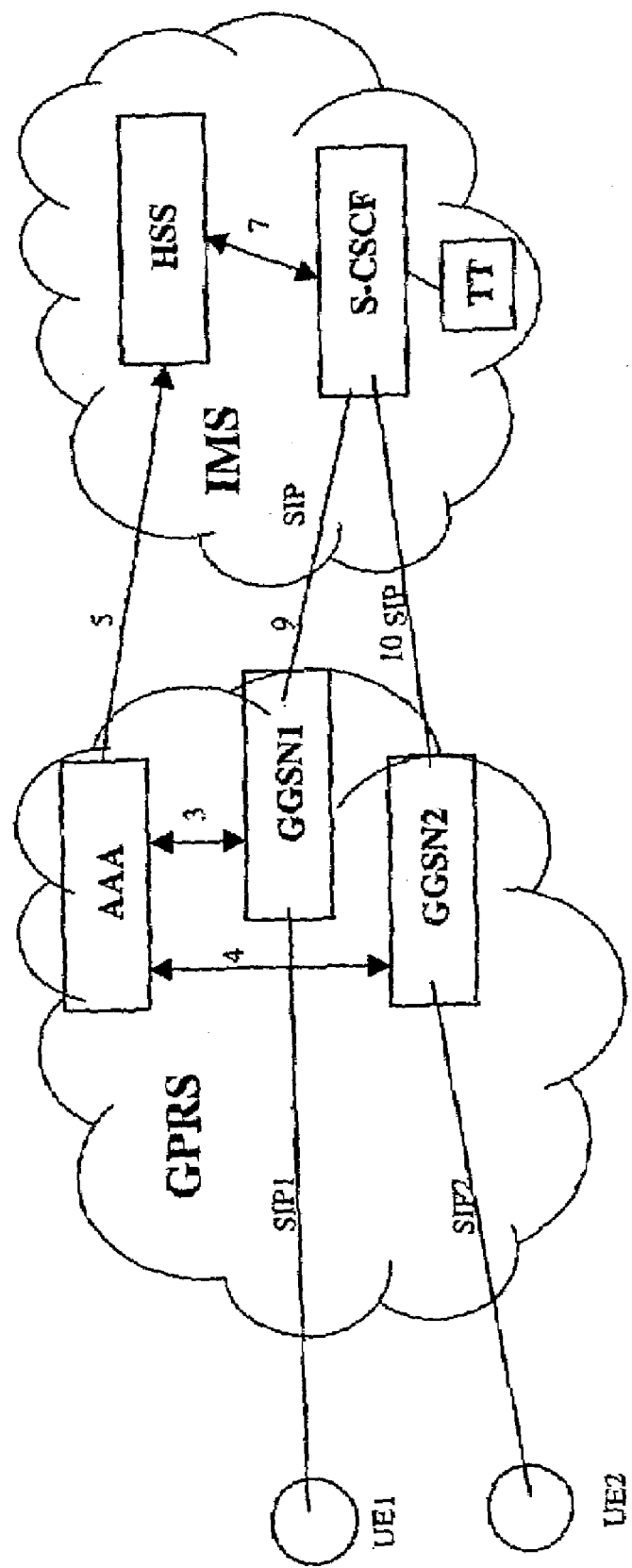

In second and third generation mobile radio networks, mobile radio users are provided with services which are provided by special networks (service networks) optimized for providing services. In this context, the service users are connected to the service network via an access network (e.g. a communication network operating on the basis of the GPRS standard). It is often beneficial for network operators to establish the identity of the service users before providing a service and to register these users upon successful authentication.

The invention is based on the object of specifying a secure and reliably operating method for registering a communication terminal belonging to a service user.

The invention achieves the object by means of a method for registering a communication terminal with a service network which organizes a communications service, where the service network is accessed by the communication terminal using an access network which connects the communication terminal to the service network, in which, in a preliminary step, a logon IP address which was assigned to the communication terminal when the communication terminal logged onto the access network is received by the service network and is stored therein for the respective user of the communication terminal, when a first registration message sent by the communication terminal is received a token is transmitted to the communication terminal using a transport message sent using the logon IP address, the token having been produced by the service network from the logon IP address and a random number using an encryption method, and token data associated with the token having been stored in the service network, when a second registration message which is sent by the communication terminal and contains the token is received the service network compares the token received with the token data, successful registration is identified if the token matches the token data, and unsuccessful registration is identified if the token does not match the token data.

Although the printed document "3GPP TS 24.228 V5.0.0 (2002-03); Technical Specification; 3rd Generation Partnership Project; Technical Specification Group Core Network; Signalling flows for the IP multimedia call control based on SIP and SDP; Stage 3; (Release 5)", page 32 in particular, discloses a method for registering a communication terminal, this method involves the service network producing a "challenge" value and sending it to the communication terminal, which then calculates a "response" value using a special "ISIM" card (ISIM=IMS SIM) in the communication terminal and returns it to the service network in a response message. This method therefore requires special communication terminals and a special access network which are based on standardization specifications from 3GGPP "Release 5". By way of example, such a special communication terminal needs to be equipped with an "ISIM" card.

Advantageously, however, the inventive method requires no communication terminals or access networks which are based on standardization specifications from 3GGPP "Release 5". Instead, the inventive method can also be used with the communication terminals and access networks existing today, which satisfy standardization specifications from 3GGPP "Release 1999" (also called "Release 3"). By way of example, communication terminals customary today which have just a conventional "Subscriber Identity Module (SIM)" card are suitable. A further advantage of the inventive method is that the token can be "guessed" only with very great difficulty, since the token is produced from the logon IP address and a random number using an encryption method. The token is transmitted to the communication terminal using a transport message sent using the logon IP address. This and the routing in the access network advantageously ensure that the token arrives exclusively at the communication terminal which has the logon IP address, which means that successful registration during the rest of the method can take place only for this one communication terminal.

The inventive method can be in a form such that the service network stores the token as token data, comparison of the received token with the token data stored in the service network involves the received token being compared with the stored token, and successful registration is identified if the received token matches the stored token. A particular advantage of this refinement of the method is that registration can be performed in a particularly simple manner, since the received token needs to be compared with the stored token in only one comparison step. This also requires no decryption of the tokens, which means that the resources of the service network are loaded only to a small degree.

The inventive method can also be in a form such that the service network stores the logon IP address and the random number as token data, reception of the second registration message by the service network is followed by decryption of the token transmitted with this second registration message, comparison of the received token with the token data stored in the service network involves the logon IP address recovered during decryption being compared with the stored logon IP address, and successful registration is identified if the recovered logon IP address matches the stored logon IP address. This embodiment advantageously permits uncomplicated further processing of the logon IP address after the registration procedure, since this address is already available in "plain text" after the comparison.

The inventive method can also proceed such that the preliminary step involves the logon IP address, which was assigned to the communication terminal when the communication terminal logged onto the access network, being assigned to a public identifier for the communication terminal via the service network, the recovered logon IP address or the token is used to read the public identifier which is stored in the service network and is associated with the logon IP address, reception of the second registration message by the service network is followed by comparison of a public identifier contained in this second registration message with the public identifier which has been read, and successful registration is identified only if the public identifier contained in this second registration message additionally matches the public identifier which has been read. This additional comparison allows even greater security to be achieved for authentication during registration.

The inventive method can be carried out such that reception of the second registration message by the service network is followed by comparison of a private identifier contained in this second registration message with a private identifier stored in the service network together with the public identifier, and successful registration is identified only if the private identifier contained in this second registration message additionally matches the private identifier stored in the service network. This results in a particularly secure method.

The inventive method can be in a form such that, to perform temporary registration, the service network starts a token timer associated with the token when the transport message is sent, and the token is marked as invalid if a predetermined validity period for the token elapses. With this refinement of the method, the token can advantageously be used only for a certain validity period. Should the token become known to unauthorized parties, then the period of any unwanted use is limited.

The inventive method allows the token to be produced by a switching center in the service network.

Alternatively, the token can be produced by a home location register in the service network.

The token can also be decrypted by the switching center in the service network.

The inventive method can also proceed such that a switching center in the service network compares the received token with the token data, the switching center identifies successful registration if the token matches the token data, and the switching center identifies unsuccessful registration if the token does not match the token data.

Figure 2:
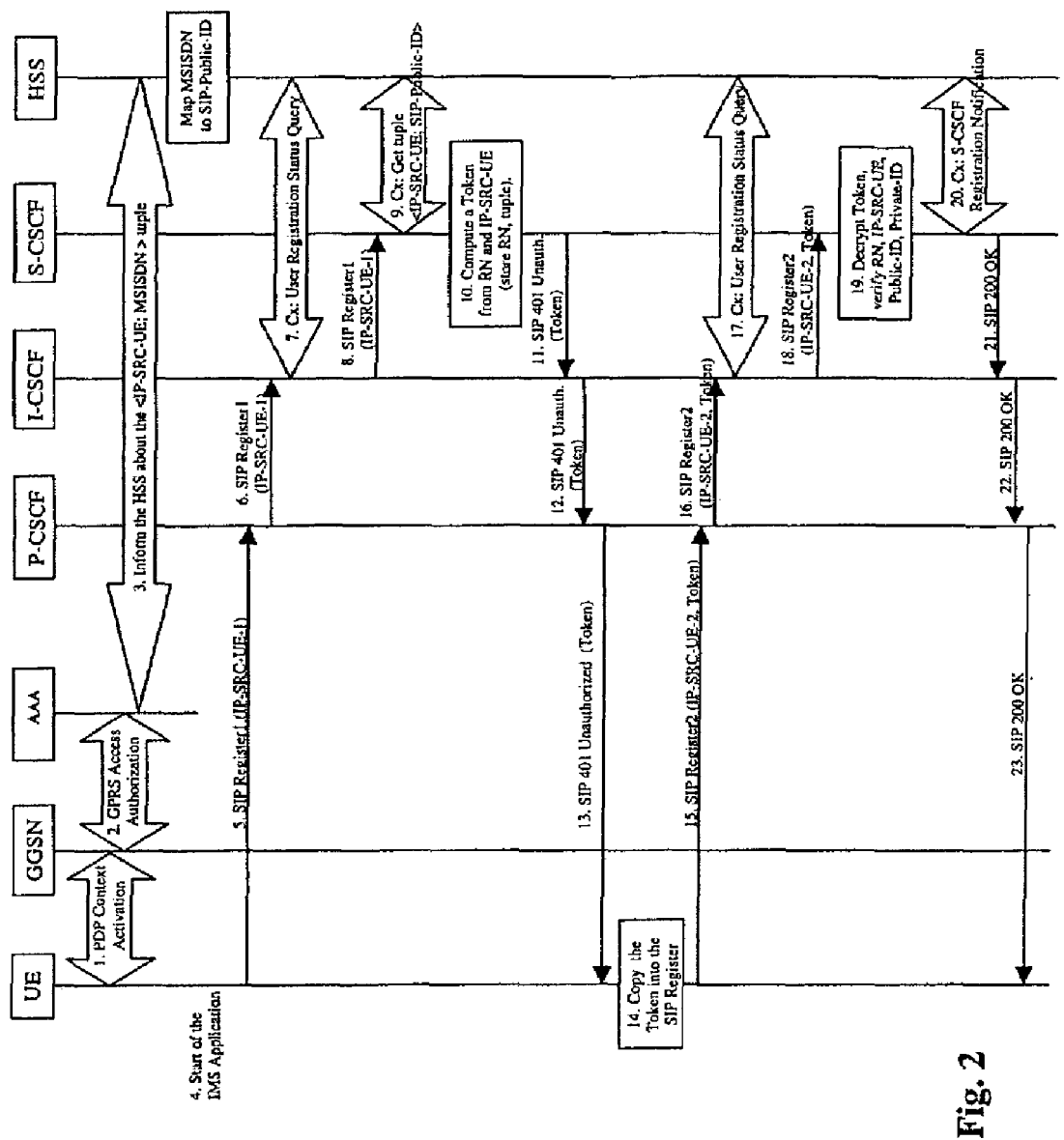

To explain the invention further,

FIG. 1 shows an exemplary embodiment of an arrangement for carrying out the inventive method, and FIG. 2 shows a schematic illustration of an exemplary embodiment of the inventive method.

FIG. 1 shows a mobile radio network GPRS, operating on the basis of "General Packet Radio Service" provisions as an access network. This access network GPRS contains a first GPRS gateway switching center GGSN1 (GGSN=Gateway GPRS Support Node), which can be connected to a first communication terminal UE1 by means of a first signal connection SIP1 operating on the basis of the SIP standard. In addition, the access network has a second GPRS gateway switching center GGSN2, which can be connected to a second communication terminal UE2 by means of a second signal connection SIP2 operating on the basis of the SIP standard. The first communication terminal UE1 and the second communication terminal UE2 can be, by way of example, mobile telephones, laptops or palmtops with a mobile radio module. The first GPRS gateway switching center GGSN1 and the second GPRS gateway switching center GGSN2 are connected to an "Authentication Authorization Accounting" server AAA in the access network by means of data links 3 and 4. The server AAA is connected to a home location register HSS (HSS=Home Subscriber Server) in an "IP Multimedia Core Network Subsystem" operating as a service network IMS by means of a data link 5. The data lines 3, 4 and 5 are used for transmitting mobile radio telephone numbers (MSISDN) and temporarily valid IP addresses for the communication terminals in the course of the method.

Of the service network IMS, only a switching center S-CSCF (CSCF=Call Session Control Function; S-CSCF=Serving CSCF) is shown, again schematically, which is connected firstly via a data link 7 to the home location register HSS and secondly via data links 9 and 10 to the first GPRS gateway switching center GGSN1 and to the second GPRS gateway switching center GGSN2. The data link 7 is used to exchange information for user authentication with the home location register HSS, and the data links 9 and 10 can be used to transmit SIP messages to the first GPRS gateway switching center GGSN1 and the second GPRS gateway switching center GGSN2. The switching center S-CSCF has a token timer TT connected to it.

The first communication terminal UE1 can be used, by way of example, to send a message, called an "IMS Instant Message", to the second communication terminal UE2; beforehand, however, it is necessary to register (log on, sign in) the first communication terminal UE1 and possibly also the second communication terminal UE2.

Hence, if a user of a communication terminal wishes to use services in the service network IMS, his communication terminal is signed into the access network (the access network is often in the form of a "Release 1999" GPRS network today). When signing into the GPRS network, inherently known GPRS user authentication is performed, which uses the SIM card provided in the terminal. In addition, the communication terminal needs to register with the service network IMS and in so doing to authenticate itself. Both procedures, logging onto the access network GPRS and logging (registration) onto the service network IMS, are performed automatically, for example, when the terminal is turned on. A fundamental part of registering with the service network is authentication by the service network. This involves a user of the communication terminal being authenticated during registration of the communication terminal with the service network. Specifically, this involves the user's SIM card, which has been inserted into the communication terminal, being identified and hence the user's person being inferred.

FIG. 2 shows how IMS user authentication is performed during IMS registration. The exemplary embodiment starts with a communication terminal UE (which can be the first communication terminal UE1 in FIG. 1, for example) signing into an access network, in this example into a GPRS access network. This involves GPRS user authentication being carried out. If this is successful, a "PDP context" is produced and the gateway GPRS switching center GGSN (GGSN=Gateway GPRS Support Node) allocates a temporary IP address IP-SRC-UE to the communication terminal UE. This IP address allows other network users to send IP packets to the communication terminal.

For the sign-in operation, the server AAA permits access control and the connection of billing data, as is known. During the sign-in operation, the server AAA receives from the gateway GPRS switching center GGSN, the temporary IP address IP-SRC-UE of the terminal UE and also the mobile radio telephone number MSISDN (MSISDN=mobile station ISDN number) of the terminal UE or of the user of the terminal. This is because GPRS compatible terminals or their users also have an associated mobile radio terminal number MSISDN; this mobile radio telephone number MSISDN can be used to read the communication terminal in the access network GPRS (or else within another GSM mobile network). These two parameters—temporary IP address IP-SRC-UE of the terminal UE and the mobile radio telephone number MSISDN—are then transmitted to the home location register HSS in the service network IMS. The communication between the gateway GPRS switching center GGSN and the server AAA can proceed in line with the methods described in 3GPP standard "TS 29.061; Technical Specification 3rd Generation Partnership Project; Technical Specification Group Core Network; Packet Domain; Interworking between the Public Land Mobile Network (PLMN) supporting Packet Based Services and Packet Data Networks (PDN)", particularly in section 16.3. Alternatively, the home location register HSS can also be connected directly to the gateway GPRS switching center GGSN using an interface, however.

Following receipt of the temporary IP address IP-SRC-UE of the terminal UE and the mobile radio telephone number MSISDN, the home location register HSS uses the mobile radio telephone number MSISDN to read from a data store in the service network the public identifier "SIP Public User ID" associated with the temporary IP address IP-SRC-UE. This is possible because the user profile for each user of the service network IMS in the data store contains not only the user's public identifier "SIP Public User ID" and his private identifier "SIP Private User ID" but also his mobile radio telephone number MSISDN. This concludes the sign-in operation. Later on during the method, a pair of parameters comprising the IP address IP-SRC-UE and the public identifier SIP-Public-ID will be transmitted to a service switching center S-CSCF in the service network.

Having signed into the access network GPRS, the communication terminal UE is IMS-registered with the service network IMS on the basis of the message protocol SIP; this is also referred to as "SIP based IMS registration" for short. This IMS user authentication involves verification of an SIP address for the communication terminal. This involves verifying the SIP Public User ID (public identifier) and the SIP Private User ID (private identifier). The SIP Public User ID is the SIP address of the communication terminal which can be used to reach the communication terminal in the service network IMS. Verification of the SIP Private User ID is the result of verification of the SIP Public User ID, since each SIP Public User ID has only one SIP Private User ID.

The SIP Public User ID can be verified during registration of the user in the service network IMS and during use of an IMS service. When a user logs his communication terminal UE onto the service network IMS, the terminal sends a message "SIP REGISTER" to the service network IMS. The aim of IMS authentication is to check whether the SIP Public User ID indicated in this message and the private user ID are correct. To this end, the inventive method involves the use of a token which is sent to the terminal by the service network IMS. This token permits verifiable linking of the IMS user to the temporary IP address which has been allocated via the gateway GPRS switching center GGSN when signing into the GPRS network. This method is described in detail below.

The communication terminal UE sends a first registration message "SIP REGISTER1" to the service network IMS. This first registration message "SIP REGISTER1" contains a temporary IP address IP-SRC-UE-1 for the terminal UE. This address does not imperatively have to correspond to the login address IP-SRC-UE which has been allocated to the terminal UE when signing into the access network GPRS, however. A dishonest user could, by way of example, manipulate the software on the terminal UE such that the first registration message "SIP REGISTER1" contains a forged temporary IP address IP-SRC-UE-1'. The first registration message "SIP REGISTER1" is routed (arrows 5 to 8) to the switching center S-CSCF in the service network IMS via further switching centers P-CSCF (P-CSCF=Proxy CSCF) and I-CSCF (I-CSCF=Interrogating CSCF).

When the first registration message "SIP REGISTER1" arrives at the switching center S-CSCF, the switching center S-CSCF requests the pair of parameters <IP-SRC-UE; SIP-Public-ID>, comprising the logon IP address IP-SRC-UE and the public identifier SIP-Public-ID, from the home location register HSS (if this pair of parameters is not already present there on account of earlier method sequences). The switching center S-CSCF then generates a token, if such a token does not already exist on account of earlier method sequences. The token is produced by encrypting the temporary IP address IP-SRC-UE and a random number RN, also referred to as "registration number". The random number RN is generated by the switching center S-CSCF and has, by way of example, a length of 64 bits or more—depending on the required security of the token. To encrypt the token, a key is used, and this key can either be the same for all users or can differ for individual users. In the latter case, the key can advantageously be stored with the user-specific data in the home location register HSS and, by way of example, can be transmitted to the switching center S-CSCF together with the message in line with arrow 9. For the purposes of encryption, it is possible to use, by way of example, the MD5 algorithm, described in IETF printed document RFC 1321.

Following production of the token, either the token itself or else a data triple <RN, IP-SRC-UE; SIP-Public-ID> comprising the random number RN, the logon IP address IP-SRC-UE and the public identifier SIP-Public-ID is stored in the local database at the switching center S-CSCF. Next, the transport message "SIP 401 UNAUTHORIZED" is generated as a response message to the first registration message "SIP REGISTER1". This transport message is used in order to transport the token from the switching center S-CSCF to the terminal UE (arrows 11-13). In this context, the token can be transported in a "RAND/RES" field of this transport message, for example.

The transport message SIP 401 UNAUTHORIZED is sent using precisely the temporary IP address IP-SRC-UE which the token contains in encrypted form. The GPRC access network ensures that this transport message SIP 401 UNAUTHORIZED is delivered only to the "correct" terminal, that is to say to that terminal UE which obtains the temporary IP address IP-SRC-UE when signing into the GPRS access network. Allocation of the temporary IP addresses in the access network GPRS is explicit, that is to say each IP address can be allocated only to a single terminal at any time.

If a manipulated registration message which contains an incorrect (forged) public identifier SIP Public User ID' or contains an incorrect temporary IP address IP-SRC-UE' which does not match the temporary IP address IP-SRC-UE allocated to the communication terminal UE by the gateway GPRS switching center GGSN is sent (arrow 5) by the communication terminal UE as first registration message SIP-REGISTER1 with dishonest intent or on account of an error, the communication terminal UE will not receive the transport message SIP 401 UNAUTHORIZED with the token. However, this token will subsequently be required for successful registration (sign-in) in the service network IMS.

Following receipt of the response message SIP 401 UNAUTHORIZED, SIP registration is continued and a second registration message "SIP REGISTER2" is generated by the terminal UE. The token received with the transport message SIP 401 UNAUTHORIZED is copied unmodified into this second registration message "SIP REGISTER2" (step 14). Next, this second registration message "SIP REGISTER2" is transmitted to the switching center S-CSCF in the service network IMS (arrows 15, 16 and 18). In addition, the token is stored on the terminal UE so that it can be inserted into some or all of the succeeding registration messages which are sent by this terminal.

If the switching center S-CSCF receives the second registration message "SIP REGISTER2" with the token, then, on the basis of a pre-selected comparison method stored in the switching center S-CSCF, either:

the token from the second registration message "SIP REGISTER2" is compared with token stored in the switching center S-CSCF, or the token is decrypted and the resultant parameters—random number RN and logon IP address IP-SRC-UE—are compared with the corresponding entry <RN, IP-SRC-UE; SIP -Public-ID> in the database at the switching center S-CSCF.

Next, the public identifier SIP Public User ID from the second registration message "SIP REGISTER2" is compared with the SIP Public User ID associated with this token, or is compared with the public identifier SIP Public User ID stored in the corresponding data triple <RN, IP-SRC-UE, SIP-Public-ID> in the switching center database. In addition, the private identifier SIP Private User ID from the second registration message "SIP REGISTER2" can be compared with the private identifier SIP Private User ID stored for the public identifier SIP Public User ID in the user profile.

The communication terminal UE (or the corresponding IMS user) is deemed to have been authenticated if 1)

the token from the second registration message "SIP REGISTER2" matches the token stored at the switching center S-CSCF, and/or the public identifier SIP Public User ID stored for this token at the switching center S-CSCF matches the public identifier SIP Public User ID from the second registration message "SIP REGISTER2" and/or the private identifier SIP Private User ID stored for this public identifier SIP Public User ID at the switching center S-CSCF matches the private SIP Private User ID from the second registration message "SIP REGISTER2".

The communication terminal UE (or the corresponding IMS user) is likewise deemed to have been authenticated if 2)

for the parameters decrypted from the token in the second registration message "SIP REGISTER2"—random number RN and logon IP address IP-SRC-UE—there exists a suitable <RN, IP-SRC-UE; SIP-Public-ID> entry in the database at the switching center S-CSCF, the public identifier SIP Public User ID stored in this entry matches the SIP Public User ID from the second registration message "SIP REGISTER2", and/or the private identifier SIP Private User ID stored for this public identifier SIP Public User ID at the switching center S-CSCF matches the private identifier SIP Private User ID from the second registration message "SIP REGISTER2".

If one of the criteria cited under 1) or one of the criteria cited under 2) does not apply, the IMS user authentication can be identified as unsuccessful and can thus be considered to have failed. In addition to the criteria cited, it is also possible to compare the match between the temporary IP address IP-SRC-UE-2 transmitted in the second registration message "SIP REGISTER2" and the logon IP address IP-SRC-UE stored for the corresponding user or for the corresponding terminal UE at the switching center S-CSCF. Following the user authentication at the switching center S-CSCF, the terminal UE is notified of the result of this authentication. In this example, successful authentication is assumed. The terminal or the user is notified of this by an information message SIP 200 OK which is sent to the terminal UE by the switching center S-CSCF (arrows 21-23). In addition, the home location register HSS is informed about successful authentication of the user.

In order to speed up the search for the associated token or for the associated data-record entry <RN, IP-SRC-UE; SIP-Public-ID> during IMS user authentication at the switching center S-CSCF, it is possible to use, by way of example, an index method for the switching-center database. The database index required for this can be created, by way of example, from the token itself or from the token data (token parameters).

In the example shown in FIG. 2, the token is generated in the switching center S-CSCF. This advantageously avoids any loading of the home location register HSS, since no random numbers need to be generated and also no encryption and decryption operations need to be performed on the home location register HSS. The home location register HSS can thus support a large number of users. Alternatively, the tokens can also be generated by the home location register HSS. One or more tokens would then be loaded onto the switching center S-CSCF from the home location register HSS in step 9 in FIG. 2. It is advantageous to transmit a plurality of tokens if "IMS re-registrations" are supported. These are explained in more detail at a later point. If the tokens are generated by the home location register HSS, token generation at the switching center S-CSCF in step 10 in FIG. 2 is dispensed with. However, the tokens are also stored at the switching center S-CSCF in this alternative case, which means that the comparison of tokens required in step 19, FIG. 2 can be made without interrogating the home location register HSS again. In this alternative refinement of the method, the subsequent procedure for IMS user authentication is identical to the example in FIG. 2. Generating the tokens in the home location register HSS has the advantage of relieving the load on the switching center S-CSCF, since in this case the switching center S-CSCF does not need to generate any random numbers and does not need to perform any encryption and decryption operations. In addition, this variant allows relatively uncomplicated subsequent changeover to "3GPP Standard UMTS AKA" authentication (AKA=Authentication and Key Agreement).

A fundamental concept of the method described is thus that of delivering the token for the temporary IP address IP-SRC-UE just to that terminal which has been assigned this IP address by the gateway GPRS switching center GGSN. This is ensured by the routing in the GPRS access network. In addition, the encryption of all messages upon transmission via the air interface ensures that the token cannot be monitored by other GPRS terminals. The use of a random number for token production prevents the token from being able to be used dishonestly by another terminal which is coincidentally assigned the same temporary IP address at a later time.

The period for IMS registration (IMS registration period) is prescribed by the service network IMS and is thus predetermined by an operator of the service network IMS, for example. The terminal is notified of this period during successful IMS registration. In order to maintain IMS registration for a longer period, the communication terminal UE needs to register again before the IMS registration period expires. This is called re-registration. Re-registration is carried out automatically by the terminal at cyclic intervals, for example. To increase security, this can also involve IMS user authentication being carried out again on the basis of a new token.

The token (TOKEN) is valid only for a particular period (validity period of the token). The validity period of the token can correspond to the IMS registration period, but it can also be longer, for example. The switching center S-CSCF manages a timer (token timer) for every token in use. The token timer is started the first time the token is sent to the terminal UE (arrow 11 in FIG. 2). The same message (arrow 11) is used to transmit the IMS registration period together with the token.

When the token timer runs out (i.e. the predetermined validity period of the token has been exceeded), then the communication terminal UE can no longer be used for any further IMS services, and the communication terminal UE needs to be re-registered with the switching center S-CSCF again. Such re-registration differs from initial registration in that the (first) re-registration message SIP REGISTER sent in the process already contains a valid token. To avoid "denial-of-service" attacks on the IMS registration, an existing token whose token timer has not yet expired is normally replaced by a new token only if the following two conditions have been satisfied:

1) the SIP REGISTER message contains the token already existing at the switching center S-CSCF, and the respective communication terminal UE (or its user) has been successfully authenticated, (i.e. the public identifier SIP Public User ID and the private identifier SIP Private User ID in the re-registration message are correct), and 2) the token timer would run out before the next re-registration.

Depending on the existing registration period and on the remaining time before the token timer expires, the switching center S-CSCF can, alternatively, also shorten the IMS registration period (by using the corresponding message [arrow 11] to notify the communication terminal of a shorter IMS registration period), so that the message SIP REGISTER for the subsequent re-registration also arrives at the switching center S-CSCF before the token timer expires. In both cases, the possible loss of SIP signaling messages is allowed for by virtue of the time intervals being provided with an additional safety buffer.

If the two aforementioned conditions 1) and 2) have been satisfied, the existing token or the corresponding entry <RN, IP-SRC-UE; SIP-Public-ID> at the switching center S-CSCF is erased. Next, similar IMS registration and IMS user authentication to those which would take place during the first run of a method are performed. In this case, the switching center S-CSCF can also use a new token which is already available, if such a token is available for this temporary IP address (IP-SRC-UE) This could be the case, for example, if a plurality of tokens have been transmitted from the home location register HSS to the switching center S-CSCF in step 9 in FIG. 2.

If the aforementioned condition 1) has been satisfied, but the condition 2) has not, then the existing token can also be used further. To this end, the SIP REGISTER message is answered using a response message SIP 200 OK, as illustrated in steps 21 to 23 in FIG. 2.

If the token timer runs out, the associated token or the corresponding entry <RN, IP-SRC-UE; SIP-Public-ID> at the switching center S-CSCF is erased. A renewed registration attempt, with or without a token, is then treated as registration for the first time.

The method described advantageously requires no new interfaces or network elements in already existing access networks GPRS. It can be implemented easily and hence inexpensively by aligning the software at the switching center S-CSCF and on the terminal UE.

The method described allows secure and reliable authentication of users of service networks. A particular advantage for the service user is that he can be registered very conveniently without having to log on using a password, for example. Another particular advantage is that the method described can be used with the "Release 1999" GPRS networks customary today as access networks for service networks IMS for the purpose of secure authentication of IMS users.

The method described can advantageously be used to prevent registration messages sent, by way of example, dishonestly using a false IP address or a false SIP Public User ID from resulting in incorrect authentication and registration.

A fundamental aspect of the invention is that IMS registration involves a token being sent, using a particular temporary IP address, to that terminal which actually has this particular temporary IP address. This is ensured by the routing mechanisms in the access network (e.g. in a GPRS network). Should a terminal have merely simulated a temporary IP address during registration, it therefore does not receive this token. The token is needed for successful IMS registration, however. In the service network (e.g. in an IP multimedia system IMS), the token permits verification of the temporary IP address. This in turn then permits secure identification of the public identifier SIP Public User ID and of the private identifier SIP Private User ID, which is based on information from the switching center GGSN and from the home location register HSS.

The service network IMS (IP Multimedia Subsystem) as such is known and is described, by way of example, in the printed document "TS 23.228 V5.4.1 (2002-04); 3rd Generation Partnership Project; Technical Specification Group Services and System Aspects; IP Multimedia Subsystem (IMS); Stage 2 (Release 5)". The method described permits reliable identification of the IMS user even if the service network IMS is connected to a "Release 1999" GPRS network, customary today, or if existing "Release 1999" terminals are used which have no ISIM card, for example.

The invention claimed is:

1. A method for registering a communication terminal with a service network which organizes a communications service, where the service network is accessed by the communication terminal using an access network which connects the communication terminal to the service network, in which in a preliminary step, a logon IP address which was assigned to the communication terminal when the communication terminal logged onto the access network is received by the service network and is stored therein for the respective user of the communication terminal, when a first registration message sent by the communication terminal is received a token is transmitted to the communication terminal using a transport message sent using the logon IP address, the token having been produced by the service network from the logon IP address and a random number using an encryption method, and token data associated with the token having been stored in the service network, when a second registration message which is sent by the communication terminal and contains the token is received the service network compares the token received with the token data, successful registration is identified if the token matches the token data, and unsuccessful registration is identified if the token does not match the token data.

2. The method as claimed in claim 1, wherein
the service network stores the token as token data,
comparison of the received token with the token data stored in the service network involves the received token being compared with the stored token, and
successful registration is identified if the received token matches the stored token.

3. The method as claimed in claim 1, wherein
the service network stores the logon IP address and the random number as token data,
reception of the second registration message by the service network is followed by decryption of the token transmitted with this second registration message,
comparison of the received token with the token data stored in the service network involves the logon IP address recovered during decryption being compared with the stored logon IP address, and
successful registration is identified if the recovered logon IP address matches the stored logon IP address.

4. The method as claimed in claim 3, wherein
the preliminary step involves the logon IP address (IP-SRC-UE), which was assigned to the communication terminal (UE) when the communication terminal (UE) logged onto the access network (GPRS), being assigned to a public identifier (SIP-Public-ID) for the communication terminal (UE) via the service network (IMS),
the recovered logon IP address or the token is used to read the public identifier which is stored in the service network and is associated with the logon IP address, reception of the second registration message by the service network is followed by comparison of a public identifier contained in this second registration message with the public identifier which has been read, and successful registration is identified only if the public identifier contained in this second registration message additionally matches the public identifier which has been read.

5. The method as claimed in claim 3, wherein reception of the second registration message by the service network is followed by comparison of a private identifier contained in this second registration message with a private identifier stored in the service network together with the public identifier, and successful registration is identified only if the private identifier contained in this second registration message additionally matches the private identifier stored in the service network.

6. The method as claimed in claim 1, wherein the service network starts a token timer associated with the token when the transport message is sent, and the token is marked as invalid if a predetermined validity period for the token elapses.

7. The method as claimed in claim 1, wherein the token is produced by a switching center in the service network.

8. The method as claimed in claim 1, wherein the token is produced by a home location register in the service network.

9. The method as claimed in claim 3, wherein the token (Token) is decrypted by the switching center in the service network.

10. The method as claimed in claim 1, characterized in that a switching center in the service network compares the received token with the token data, the switching center identifies successful registration if the token matches the token data, and the switching center identifies unsuccessful registration if the token does not match the token data.

\* \* \* \* \*